(12) United States Patent
Koo

(10) Patent No.: US 9,352,733 B2
(45) Date of Patent: May 31, 2016

(54) ELECTRONIC HYDRAULIC BRAKE DEVICE

(71) Applicant: HYUNDAI MOBIS CO., LTD., Seoul (KR)

(72) Inventor: Chang Hoe Koo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 6 days.

(21) Appl. No.: 14/253,698

(22) Filed: Apr. 15, 2014

(65) Prior Publication Data

US 2015/0097418 A1  Apr. 9, 2015

(30) Foreign Application Priority Data

Oct. 7, 2013  (KR) ........................ 10-2013-0119516

(51) Int. Cl.
  *B60T 13/58*  (2006.01)
  *B60T 11/20*  (2006.01)
  *B60T 7/04*  (2006.01)
  *B60T 17/04*  (2006.01)

(52) U.S. Cl.
  CPC ................. *B60T 11/20* (2013.01); *B60T 7/042* (2013.01); *B60T 17/04* (2013.01)

(58) Field of Classification Search
  CPC ....................................................... B60T 13/58
  USPC .................................................. 303/14, 147
  See application file for complete search history.

(56) References Cited

U.S. PATENT DOCUMENTS

| | | | |
|---|---|---|---|
| 6,053,205 A * | 4/2000 | Feldmann | 137/627.5 |
| 6,212,459 B1 * | 4/2001 | Unterforsthuber | 701/70 |
| 6,249,736 B1 * | 6/2001 | Schmidt et al. | 701/70 |
| 6,382,737 B1 * | 5/2002 | Isono et al. | 303/114.1 |
| 6,443,534 B2 * | 9/2002 | Kamiya | 303/113.5 |
| 7,686,404 B2 * | 3/2010 | Lehmann et al. | 303/114.3 |
| 8,939,519 B2 * | 1/2015 | Masuda et al. | 303/114.1 |
| 2009/0212621 A1 * | 8/2009 | Drott et al. | 303/14 |
| 2011/0175437 A1 * | 7/2011 | Yamamoto et al. | 303/14 |
| 2012/0091787 A1 * | 4/2012 | Nishino et al. | 303/14 |
| 2012/0161506 A1 * | 6/2012 | Tanaka et al. | 303/14 |
| 2012/0306260 A1 * | 12/2012 | Ohkubo et al. | 303/14 |
| 2013/0043718 A1 * | 2/2013 | Feigel | 303/14 |
| 2013/0049451 A1 * | 2/2013 | Schiel | 303/14 |
| 2013/0082514 A1 * | 4/2013 | Murakami et al. | 303/14 |
| 2013/0127240 A1 * | 5/2013 | Noro et al. | 303/14 |

FOREIGN PATENT DOCUMENTS

KR  10-2007-0104982 A  10/2007

* cited by examiner

*Primary Examiner* — Robert A Siconolfi
*Assistant Examiner* — James Hsiao
(74) *Attorney, Agent, or Firm* — Knobbe Martens Olson & Bear LLP

(57) ABSTRACT

An electronic hydraulic brake device may include: a reservoir storing brake oil; a reaction cylinder connected to the reservoir, and changing a pedal force and brake oil pressure in connection with motion of a pedal; a reaction valve installed between the reservoir and the reaction cylinder so as to control transfer of brake oil; a wheel brake restraining rotation of each wheel in connection with the operation of the reaction cylinder; and a brake valve installed on a connection pipeline for connecting the wheel brake and the reaction cylinder so as to control transfer of brake oil.

9 Claims, 5 Drawing Sheets

ELECTRONIC HYDRAULIC BRAKE DEVICE

CROSS-REFERENCES TO RELATED APPLICATIONS

The present application claims priority to Korean application number 10-2013-0119516, filed on Oct. 7, 2013 in the Korean Intellectual Property Office, which is incorporated by reference in its entirety.

BACKGROUND OF THE INVENTION

The present invention relates to an electronic hydraulic brake device, and more particularly, to an electronic hydraulic brake device capable of realizing the functions of a pedal simulator and a backup master cylinder through a single device.

In general, an electronic hydraulic brake device senses a driver's pedal pressure through a sensor and controls the brake pressure of each wheel using a hydraulic modulator.

The electronic hydraulic brake device includes a sensor and a pedal simulator. The sensor senses a stroke distance of a pedal so as to indicate brake pressure desired by a driver, and the pedal simulator causes the driver to feel the same pedal pressure as a general hydraulic brake device.

In a normal state, when the driver steps on the brake pedal, pressure is generated from a backup master cylinder and then transmitted to the pedal simulator, thereby providing a reaction feel to the driver.

A controller determines a brake force requested by the user through a pedal stroke sensor and a pressure sensor, and drives a main master cylinder to generate a brake force of a wheel brake.

Conventionally, the backup master cylinder and the pedal simulator have been separately provided. Thus, the device inevitably has a large size, and the productivity is degraded due to the increase in number of parts.

Furthermore, a process of injecting brake oil is separately performed in a production line, because the backup master cylinder and the pedal simulator are separately installed. Thus, since an additional device is needed, the maintenance cost is increased. Therefore, there is a demand for a system capable of solving the problems.

The related art of the present invention is disclosed in Korean Patent Laid-open Publication No. 2007-0104982 published on Oct. 30, 2007 and entitled "Control apparatus for valve in electro-hydraulic brake system".

SUMMARY OF THE INVENTION

An embodiment of the present invention is directed to an electronic hydraulic brake device which is capable of realizing the functions of a pedal simulator and a backup master cylinder through one device, thereby simplifying an assembling process.

Another embodiment of the present invention is directed to an electronic hydraulic brake device which is capable of realizing the functions of a pedal simulator and a backup master cylinder through one device such that an oil injection process is easily performed, thereby reducing a maintenance cost.

In one embodiment, an electronic hydraulic brake device may include: a reservoir storing brake oil; a reaction cylinder connected to the reservoir, and changing a pedal force and brake oil pressure in connection with motion of a pedal; a reaction valve installed between the reservoir and the reaction cylinder so as to control transfer of brake oil; a wheel brake restraining rotation of each wheel in connection with the operation of the reaction cylinder; and a brake valve installed on a connection pipeline for connecting the wheel brake and the reaction cylinder so as to control transfer of brake oil.

The reaction cylinder may include: a main body having an operation space formed therein; a first pressure generation unit positioned in the main body and pressurizing brake oil therein in connection with the operation of the pedal; and a second pressure generation unit installed to face the first pressure generation unit in the main body, and pressurizing brake oil therein in connection with the motion of the first pressure generation unit.

The first pressure generation unit may be disposed more adjacent to the pedal than the second pressure generation unit.

The first pressure generation unit may include: a first piston connected to the pedal and linearly moving along the inside of the main body; and a first elastic member installed between the first piston and the second pressure generation unit, and elastically supporting the first piston.

The first piston may have a first connection hole formed in the body thereof, and the first connection hole may communicate with a first body connection hole formed in the main body, when the first piston is positioned at the initial position.

The first elastic member may be formed in a coil spring shape, and may have one end coupled to the first piston and the other end coupled to the second pressure generation unit.

The second pressure generation unit may include: a second piston supporting the first elastic member and linearly moving along the inside the main body; a fixed member fixed to the main body; a second elastic member supported by the fixed member and elastically supporting the second piston; and a reaction damper installed between the fixed member and the second piston, and compressed through the motion of the second piston so as to form a reaction force.

The second piston may have a second connection hole formed in the body thereof, and the second connection hole may communicate with a second body connection hole formed in the main body, when the second piston is positioned at the initial position.

The second piston may have a reaction damper positioned therein, one side of the second piston may be contacted with the first elastic member, and the other side of the second piston may be contacted with the second elastic member.

The second elastic member having a coil spring shape may be installed outside the fixed member, and the fixed member may be inserted into the second piston so as to support the reaction damper.

The reaction cylinder and the reservoir may be connected through a first pipeline, the reaction cylinder and the wheel brake may be connected through a connection pipeline, and a reaction valve may be installed on a second pipeline for connecting the first pipeline and the connection pipeline.

The connection pipeline may include: a third pipeline for connecting the second body connection hole of the main body to the wheel brake; and a fourth pipeline for connecting the first body connection hole of the main body to the wheel brake.

The reaction valve may include: a reaction body installed on the second pipeline; a reaction ball for opening/closing a hole of the reaction body communicating with the second pipeline; and a reaction spring for elastically supporting the reaction ball.

The brake valve may include: a valve body installed on the connection pipeline; a valve ball for opening/closing a hole of the valve body communicating with the connection pipeline; and a valve spring for elastically supporting the valve ball in a direction away from the hole of the valve body.

The opening/closing operations of the reaction valve and the brake valve may be performed in reverse.

The electronic hydraulic brake device in accordance with the embodiment of the present invention may realize the functions of a pedal simulator and a backup master cylinder through the reaction cylinder. Thus, the assembling process may be simplified, and the oil injection operation may be easily performed to reduce the maintenance cost.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
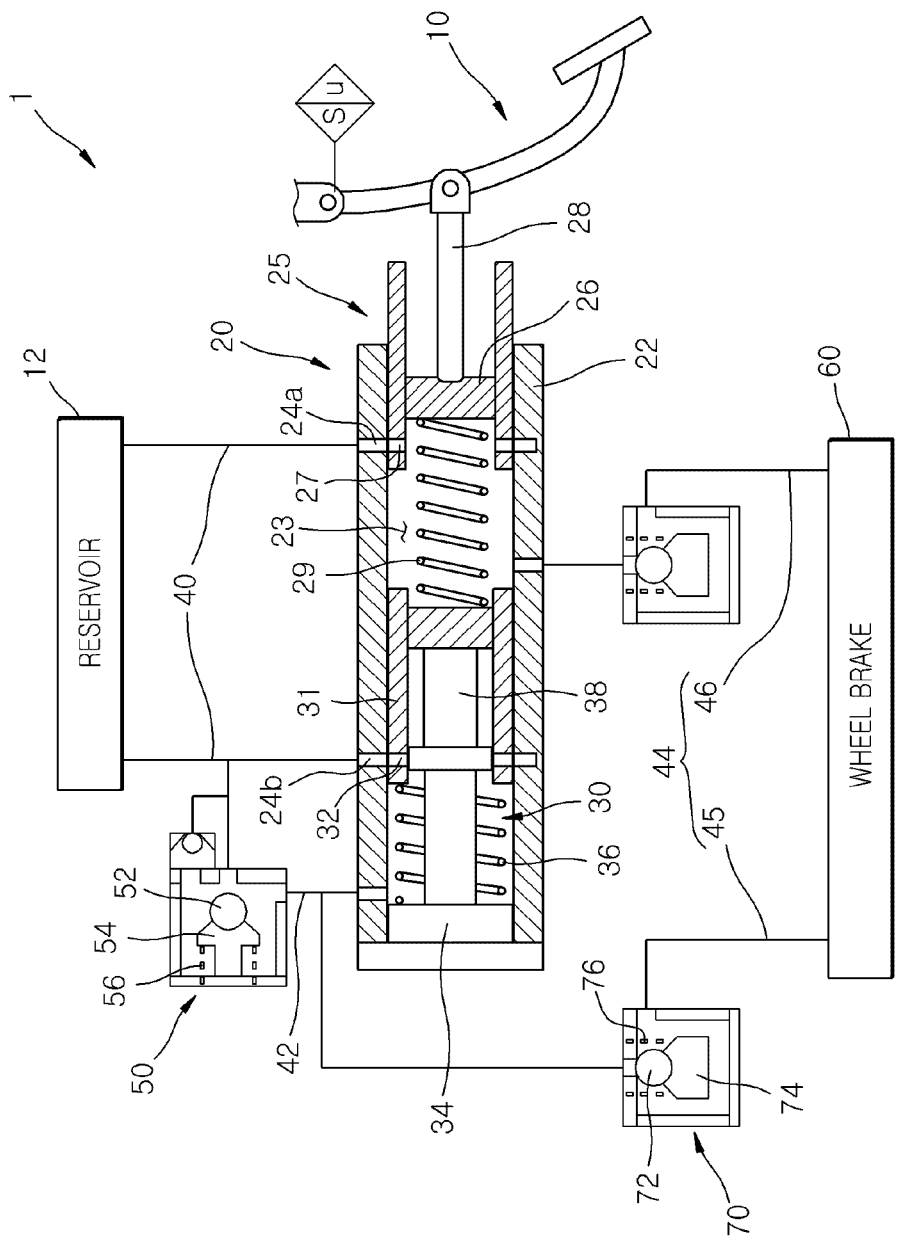
FIG. 1 schematically illustrates the structure of an electronic hydraulic brake device in accordance with an embodiment of the present invention.
Figure 2:
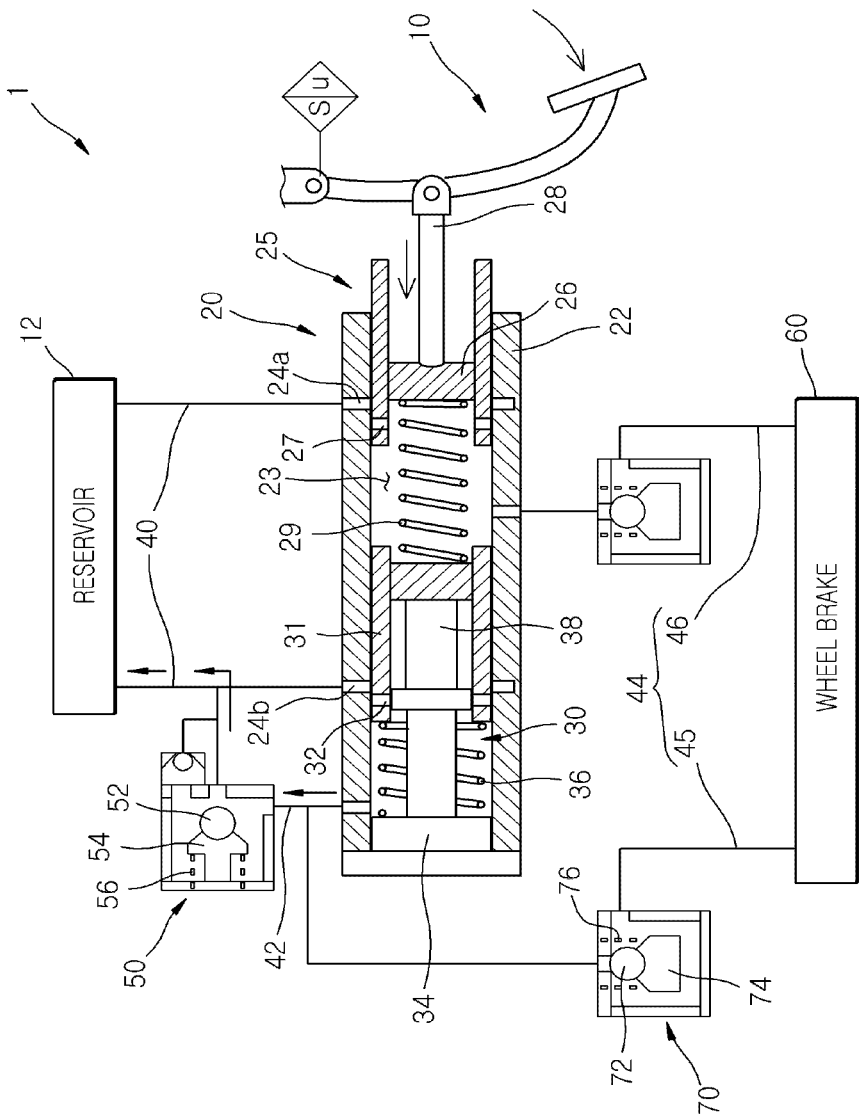
FIG. 2 schematically illustrates a state in which the electronic hydraulic brake device in accordance with the embodiment of the present invention operates in a normal mode.
Figure 3:
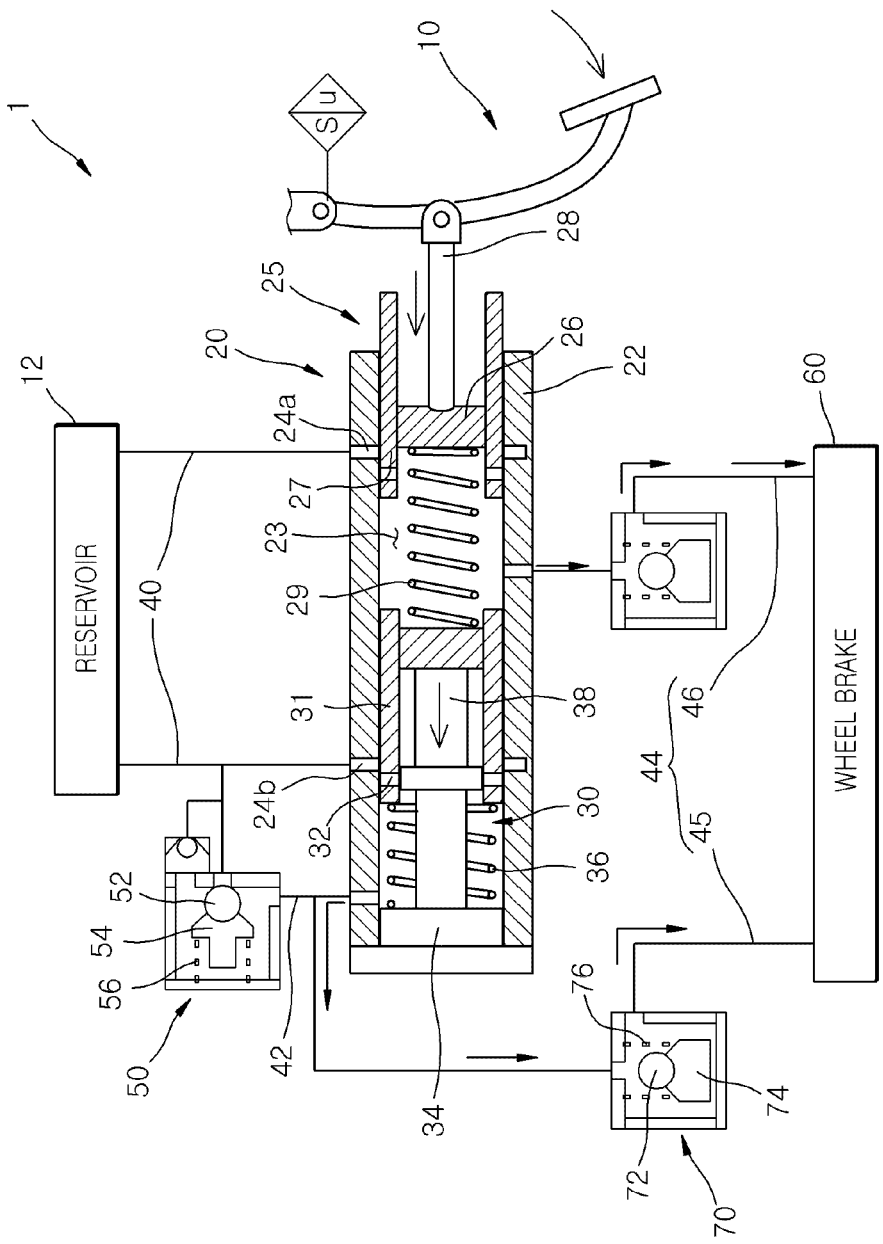
FIG. 3 schematically illustrates a state in which the electronic hydraulic device in accordance with the embodiment of the present invention operates in a fail safe mode.
Figure 4:
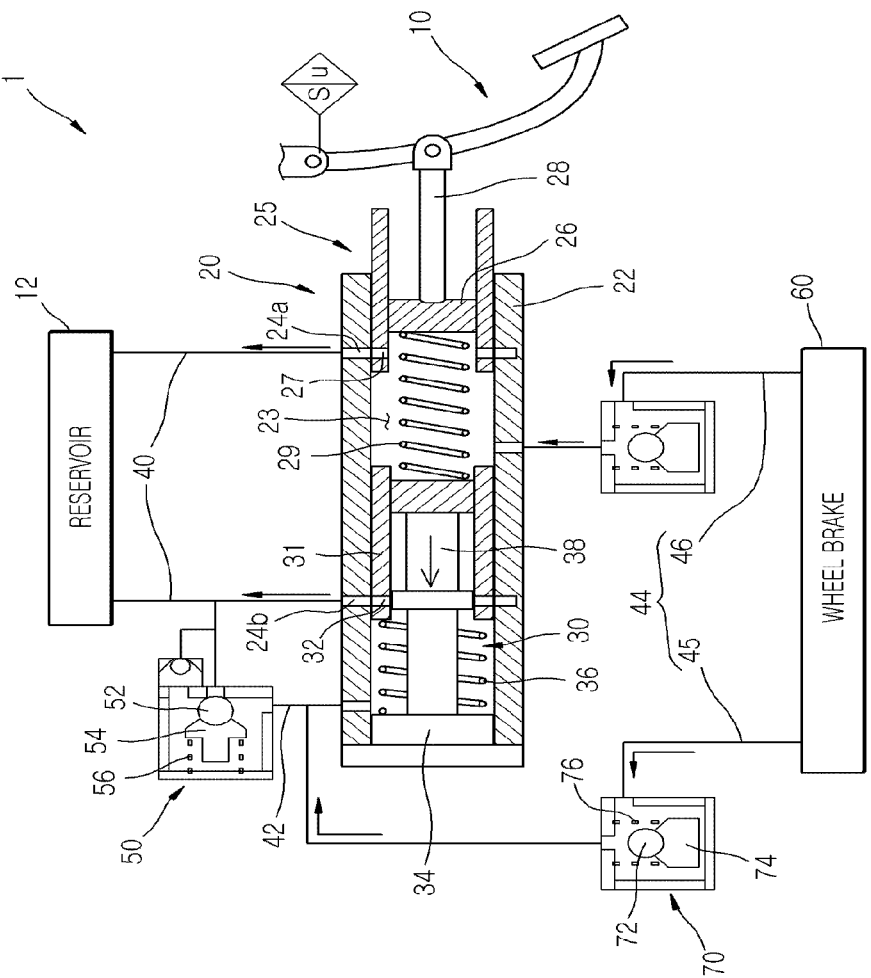
FIG. 4 schematically illustrates an operation state in which the electronic hydraulic brake device in accordance with the embodiment of the present invention is vacuumized.
Figure 5:
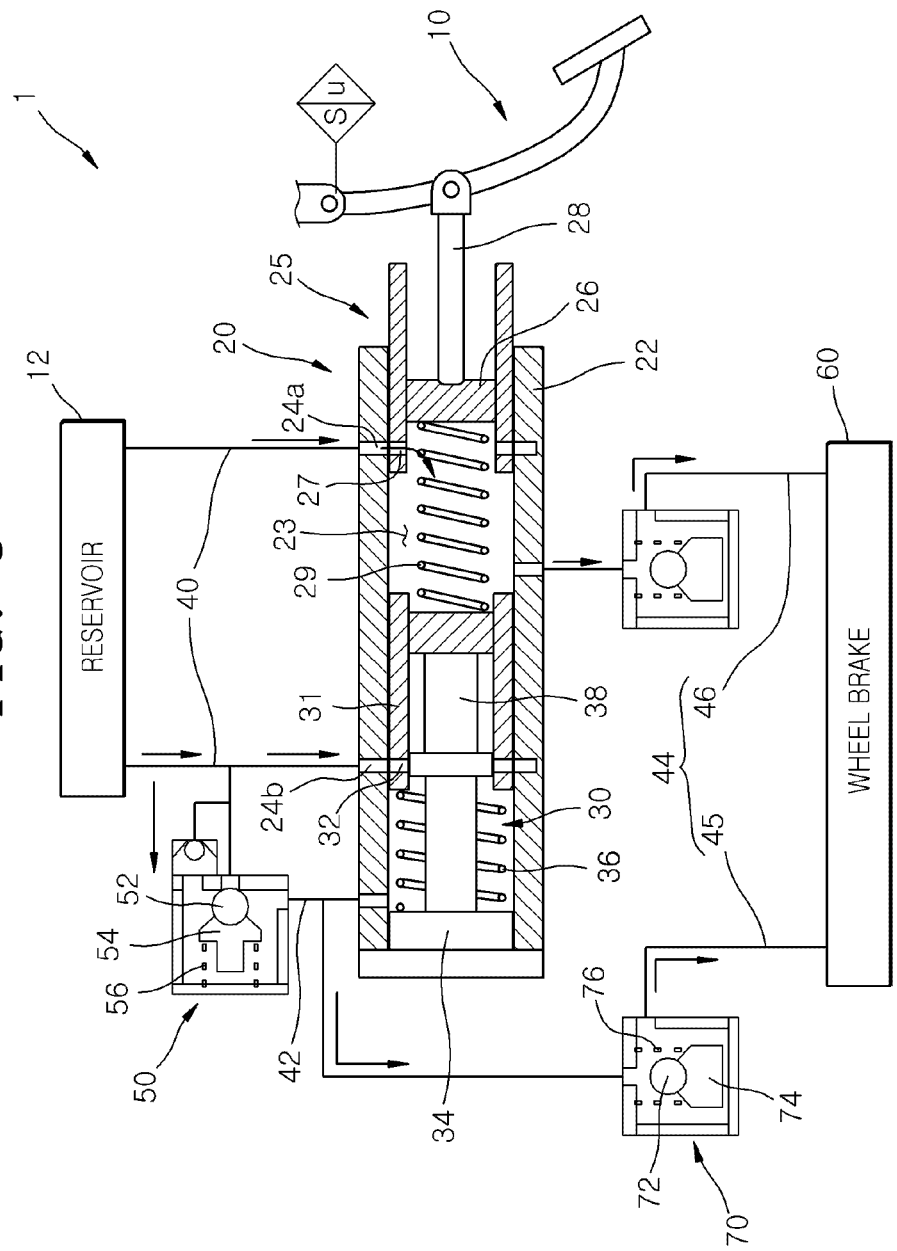
FIG. 5 schematically illustrates a state in which brake oil is supplied to the electronic hydraulic brake device in accordance with the embodiment of the present invention.

FIG. 1 schematically illustrates the structure of an electronic hydraulic brake device in accordance with an embodiment of the present invention. FIG. 2 schematically illustrates a state in which the electronic hydraulic brake device in accordance with the embodiment of the present invention operates in a normal mode. FIG. 3 schematically illustrates a state in which the electronic hydraulic device in accordance with the embodiment of the present invention operates in a fail safe mode. FIG. 4 schematically illustrates an operation state in which the electronic hydraulic brake device in accordance with the embodiment of the present invention is vacuumized. FIG. 5 schematically illustrates a state in which brake oil is supplied to the electronic hydraulic brake device in accordance with the embodiment of the present invention.

As illustrated in FIGS. 1 and 2, the electronic hydraulic brake device 1 in accordance with the embodiment of the present invention may include a reservoir 12, a reaction cylinder 20, a reaction valve 50, a wheel brake 60, and a brake valve 70. The reservoir 12 may store brake oil. The reaction cylinder 20 may be connected to the reservoir 12 so as to change a pedal force and brake oil pressure in connection with motion of the pedal 10. The reaction valve 50 may be installed between the reservoir 12 and the reaction cylinder 20 so as to control transfer of brake oil. The wheel brake 60 may control the rotation of each wheel in connection with the operation of the reaction cylinder 20. The brake valve 70 may be installed on a connection pipeline 44 for connecting the wheel brake 60 and the reaction cylinder 20, and control transfer of brake oil.

The reservoir 12 may be installed to supply liquid when the volume of liquid in a system using liquid is varied according to the change of temperature, and referred to as a reserve tank.

The reservoir 12 used in the electronic hydraulic brake device 1 may store brake oil therein.

The pedal 10 which is rotated by a driver's manipulation is connected to the reaction cylinder 20.

The reaction cylinder 20 may include various types of driving devices, as long as they can change a pedal force and brake oil pressure in connection with the motion of the pedal 10.

The reaction cylinder 20 in accordance with the embodiment of the present invention may include a main body 22, a first pressure generation unit 25, and a second pressure generation unit 30. The main body 22 may have an operation space 23 formed therein. The first pressure generation unit 25 may be positioned in the main body 22, and pressurize brake oil therein in connection with the operation of the pedal 10. The second pressure generation unit 30 may be installed in the main body 22 so as to face the first pressure generation unit 25, and pressurize brake oil therein in connection with the motion of the first pressure generation unit 25.

The operation space 23 may be formed in the main body 22, and both sides of the main body 22 may be opened.

The first pressure generation unit 25 may be installed at one side of the main body 22 (right side in FIG. 1), and the second pressure generation unit 30 may be installed at the other side of the main body 22 (left side in FIG. 1).

The first pressure generation unit 25 may be modified in various manners, as long as the modifications can be operated by the rotation of the pedal 10, pressurize brake oil therein, and pressurize the second pressure generation unit 30 to the other side of the main body 22.

The first pressure generation unit 25 in accordance with the embodiment of the present invention may include a first piston 26 and a first elastic member 29. The first piston 26 may be hinge-connected to the pedal 10 so as to linearly move along the inside of the main body 22, and the first elastic member 29 may be installed between the first piston 26 and the second pressure generation unit 30 so as to elastically support the first piston 26.

Since an extension member 28 protruding from one side of the first piston 26 is hinge-connected to the body of the pedal 10, the first piston 26 may be linearly moved inside the main body 22 in connection with the rotation of the pedal 10.

As illustrated in FIG. 1, the first piston 26 may have a first connection hole 27 formed in the body thereof. When the first piston 26 is positioned at the initial position, the first connection hole 27 may communicate with a first body connection hole 24a.

The first elastic member 29 may be formed in a coil spring shape, one side of the first elastic member 29 may be coupled to the first piston 26, and the other side of the first elastic member 29 may be coupled to the second pressure generation unit 30.

The second pressure generation unit 30 may be installed in the main body 22 so as to face the first pressure generation unit 25, and modified in various manners as long as the modifications can pressurize brake oil therein in connection with the movement of the first pressure generation unit and form a pedal force in response to rotation of the pedal 10.

The second pressure generation unit 30 in accordance with the embodiment of the present invention may include a second piston 31, a fixed member 34, a second elastic member 36, and a reaction damper 38. The second piston 31 may support the first elastic member 29 and linearly move along the inside of the main body 22. The fixed member 34 may be fixed to the main body 22. The second elastic member 36 may be supported by the fixed member 34, and elastically support the second piston 31. The reaction damper 38 may be installed between the fixed member 34 and the second piston 31, and compressed through the motion of the second piston 31 so as to form a reaction force.

The second piston 31 may be installed to linearly move inside the main body 22, and have a second connection hole 32 formed in the body thereof. When the second piston 31 is positioned at the initial position, the second connection hole 32 may communicate with a second body connection hole 24b.

The second piston 31 in accordance with the embodiment of the present invention has a cross-section formed in a U-shape. The reaction damper 38 may be positioned inside the second piston 31, one side of the second piston 31 may be contacted with the first elastic member 29, and the other side of the second piston 31 may be contacted with the second elastic member 36.

The second elastic member 36 having a coil spring shape may be installed outside the fixed member 34 fixed to the other side of the main body 22, and one side of the fixed member 34 may be installed into the second piston 31 so as to support the reaction damper 38.

The reaction damper 38 may be installed between the second piston 31 and the fixed member 34, and may include various types of pedal force devices, as long as they can form a pedal force in response to the rotation of the pedal 10, while compressed through the motion of the second piston 31.

The reaction damper 38 in accordance with the embodiment of the present invention may include rubber, and form a pedal force through an elastic restoring force of rubber.

The reaction cylinder 20 and the reservoir 12 may be connected through a first pipeline 40, the reaction cylinder 20 and the wheel brake 60 may be connected through a connection pipeline 44, and the reaction valve 50 may be installed on a second pipeline 42 for connecting the connection pipeline 44 and the first pipeline 40.

The connection pipeline 44 may include a third pipeline 45 and a fourth pipeline 46. The third pipeline 45 may connect the wheel brake 60 to the second body connection hole 24b of the main body 22 having the second pressure generation unit 30 installed therein, and the fourth pipeline 46 may connect the wheel brake 60 to the first body connection hole 24a of the main body 22 having the first pressure generation unit 25 installed therein.

The reaction valve 50 may include various types of valves, as long as they can be installed on the second pipeline 42 for connecting the reservoir 12 and the reaction cylinder 20 so as to control the transfer of brake oil.

The reaction valve 50 in accordance with the embodiment of the present invention may include a reaction body 54 installed on the second pipeline 42, a reaction ball 52 for opening/closing a hole of the reaction body 54 communicating with the second pipeline 42, and a reaction spring 56 for elastically supporting the reaction ball 52.

The reaction valve 50 may be operated in a normal close type, and open a pipeline according to a control signal.

The brake valve 70 may include various types of valves, as long as they can installed on the connection pipeline 44 for connecting the wheel brake 60 and the reaction cylinder 20 and control the transfer of brake oil.

The brake valve 70 in accordance with the embodiment of the present invention may include a valve body 74 installed on the connection pipeline 44, a valve ball 72 for opening/closing a hole of the valve body 74 communicating with the connection pipeline 44, and a valve spring 76 for elastically supporting the valve ball 72 in a direction away from the hole of the valve body 74.

The brake valve 70 may be operated in a normal open type, and close the pipeline according to a control signal.

The opening/closing operations of the reaction valve 50 and the brake valve 70 in accordance with the embodiment of the present invention may be performed in reverse. That is, while the reaction valve 50 is opened, the brake valve 70 may be closed, and while the reaction valve 50 is closed, the brake valve 70 may be opened.

The wheel brake 60 may restrain the rotation of each wheel in connection with the operation of the reaction cylinder 20, and include a main master cylinder, a caliper and the like. Since the structure and operation state of the wheel brake 60 are well-known, the detailed descriptions thereof are omitted herein.

In the embodiment of the present invention, it has been described that the second pressure generation unit 30 for generating a reaction force is installed at the other side of the main body 22. However, this is only an example, and the second pressure generation unit 30 may be installed at the one side of the main body 22 and coupled to the pedal 10.

Hereafter, the operation state of the electronic hydraulic brake device 1 in accordance with the embodiment of the present invention will be described in detail with reference to the accompanying drawings.

As illustrated in FIG. 1, when the electronic hydraulic brake device 1 is normally operated, the reaction valve 50 may open the second pipeline 42, and the brake valve 70 may block the transfer of brake oil through the connection pipeline 44.

As illustrated in FIG. 2, when the first piston 26 of the first pressure generation unit 25 is moved toward the other side of the main body 22 through rotation of the pedal 10, brake oil between the first piston 26 and the second piston 31 may be compressed.

The second piston 31 may be moved to the other side of the main body 22 through the pressure of the brake oil compressed in the first pressure generation unit 25 and the elastic force of the first elastic member 29 compressed by the first piston 26.

The reaction damper 38 inside the second piston 31 may be compressed through the motion of the second piston 31, and form a pedal force in response to the rotation of the pedal 10.

Since the elastic restoring force of the second elastic member 36 for elastically supporting the second piston 31 is increased through the motion of the second piston 31, the second elastic member 36 may form a pedal force with the reaction damper 38.

The measurement value of the sensor to sense the movement of the reaction cylinder 20 may be transmitted to the controller, and the controller may transfer a control signal to the wheel brake 60 so as to control the rotation of the wheels.

The brake oil within the second pressure generation unit 30 may be compressed and partially transferred to the reservoir 12 through the reaction valve 50.

In the fail safe mode as illustrated in FIG. 3, the reaction force 50 may block a flow of brake oil transferred along the second pipeline 42, and the brake valve 70 may allow a flow of brake oil transferred along the connection pipeline 44.

The brake oil within the first and second pressure generation units 25 and 30 may be compressed through the operation of the pedal 10. The compressed brake oil may be transmitted to the wheel brake 60 through the connection pipeline 44 including the third and fourth pipelines 45 and 46, and restrain the rotation of the wheels.

Since the reaction damper 38 is also compressed in the fail safe mode, the brake oil pressure of the second pressure generation unit 30 may be set lower than the brake oil pressure of the first pressure generation unit 25.

When a driver puts on the brakes, the center of gravity of the vehicle may be moved toward the front of the vehicle, and the rear wheels of the vehicle may require a smaller brake force than the front wheels of the vehicle. Thus, the brake oil of the first pressure generation unit 25 may be supplied to the wheel brake 60 for restraining the front wheels of the vehicle, and the brake oil of the second pressure generation unit 30 may be supplied to the wheel brake 60 for restraining the rear wheels of the vehicle.

As illustrated in FIG. 4, the reaction valve 50 may close the second pipeline 42 and the brake valve 70 may open the connection pipeline 44, before brake oil is injected into the electronic hydraulic brake device 1.

When a vacuum device is connected to the reservoir 12 so as to vacuumize the reservoir 12, the air within the connection pipeline 44 of the wheel brake 60 and the first and second pipelines 40 and 42 of the reaction cylinder 20 may be transferred to the reservoir 12 and then discharged to the outside.

As illustrated in FIG. 5, when brake oil is supplied through the reservoir 12, the brake oil may be supplied to the reaction cylinder 20, the reaction valve 50, the wheel brake 60, the brake valve 70 and the like, which makes it possible to simplify the process related to the oil supply.

In accordance with the embodiment of the present invention, the functions of the pedal simulator and the backup master cylinder may be implemented through the reaction cylinder 20. Thus, the assembling process may be simplified, and the oil injection operation may be easily performed to reduce the maintenance cost.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. An electronic-hydraulic brake device comprising:
 a brake pedal;
 a reservoir storing brake oil;
 a reaction cylinder comprising: a cylinder body, a first piston and a second piston;
 the first piston slidably engaged with the cylinder body and operably connected to the brake pedal for sliding relative to the cylinder body when the brake pedal is pressed or unpressed;
 the second piston slidably engaged with the cylinder body and configured for sliding relative to the cylinder body when the first piston slides relative to the cylinder body;
 a first chamber defined inside the cylinder body and between the first piston, the second piston, the first chamber filled with brake oil;
 a second chamber defined between the cylinder body and the second piston, the second chamber filled with brake oil and not in direct fluid communication with the first chamber;
 the second chamber comprising a first brake oil port and a second brake oil port formed through the cylinder body;
 the second chamber being in fluid communication with the reservoir through the first brake oil port depending upon a position of the second piston within the cylinder body as the second piston blocks or unblock the first brake oil port while sliding relative to the cylinder body;
 a reaction valve installed outside the reaction cylinder and between the reservoir and the second brake oil port of the second chamber;
 a wheel brake selectively in fluid communication with the second chamber for braking at least one wheel;
 a first brake valve installed outside the reaction cylinder and between the second chamber and the wheel brake; and
 a controller configured to control the reaction valve and the first brake valve for a fail-safe (hydraulic) operational mode and a normal (electronic) operational mode such that in the fail-safe (hydraulic) operational mode the reaction valve is closed and the first brake valve is open whereas in the normal (electronic) operational mode the reaction valve is open and the first brake valve is closed;
 wherein during the fail-safe (hydraulic) operational mode, the second chamber is not in fluid communication with the reservoir and is in fluid communication with the wheel brake via the first brake valve, by which hydraulic pressure within the second chamber is transferred to the wheel brake;
 wherein during the normal (electronic) operational mode, the second chamber is in fluid communication with the reservoir through the reaction valve and is not in fluid communication with the wheel brake, by which hydraulic pressure within the second chamber is not transferred to the wheel brake;
 wherein the electronic-hydraulic brake device does not comprise a separate pedal simulator.

2. The electronic hydraulic brake device of claim 1, wherein the first chamber comprising a brake oil port, wherein the first chamber is in fluid communication with the reservoir via the brake oil port of the first chamber depending upon a position of the first piston relative to the cylinder body.

3. The electronic hydraulic brake device of claim 1, further comprising a first spring inside the first chamber.

4. The electronic hydraulic brake device of claim 1, further comprising:
 an elastic member within the second chamber; and
 a reaction damper installed within the second chamber and configured to be compressed along a direction of motion of the second piston.

5. The electronic hydraulic brake device of claim 1, further comprising a first spring within the first chamber and a second spring within the second chamber, wherein the second piston is interposed between and contacts the first and second spring.

6. The electronic hydraulic brake device of claim 1, further comprising a coil spring and a reaction damper within the second chamber.

7. The electronic hydraulic brake device of claim 1, further comprising a second brake valve installed outside the reaction cylinder and between the first chamber and the wheel brake;
 wherein the controller is further configured to control the second brake valve such that in the fail-safe (hydraulic) operational mode the second brake valve is open whereas in the normal (electronic) operational mode the second brake valve is closed;
 wherein during the fail-safe (hydraulic) operational mode, the first chamber is in fluid communication with the wheel brake via the second brake valve, by which hydraulic pressure within the first chamber is transferred to the wheel brake.

8. The electronic hydraulic brake device of claim 1, wherein the reaction valve comprises:
 a reaction body;
 a reaction ball for opening/closing a hole of the reaction body; and a reaction spring for elastically supporting the reaction ball.

9. The electronic hydraulic brake device of claim 1, wherein the first brake valve comprises:
 a valve body;
 a valve ball for opening/closing a hole of the valve body; and
 a valve spring for elastically supporting the valve ball in a direction away from the hole of the valve body.

* * * * *